United States Patent
Goodman et al.

(10) Patent No.: US 7,970,856 B2
(45) Date of Patent: Jun. 28, 2011

(54) SYSTEM AND METHOD FOR MANAGING AND DISTRIBUTING ASSETS OVER A NETWORK

(75) Inventors: Brian D. Goodman, Norwalk, CT (US); Gregory J. Boss, American Fork, UT (US); Christopher J. Dawson, Arlington, VA (US); Rick A. Hamilton, II, Charlottesville, VA (US)

(73) Assignee: International Business Machines Corporation, Armonk, NY (US)

( * ) Notice: Subject to any disclaimer, the term of this patent is extended or adjusted under 35 U.S.C. 154(b) by 1130 days.

(21) Appl. No.: 11/421,980

(22) Filed: Jun. 2, 2006

(65) Prior Publication Data
US 2007/0282899 A1 Dec. 6, 2007

(51) Int. Cl.
*G06F 15/16* (2006.01)

(52) U.S. Cl. ........ 709/217; 709/216; 709/218; 709/225; 709/226; 709/229

(58) Field of Classification Search .................. 709/217, 709/216, 203, 201, 227; 79/216, 217, 218, 79/229, 226
See application file for complete search history.

(56) References Cited

U.S. PATENT DOCUMENTS

| | | | |
|---|---|---|---|
| 6,233,606 B1 * | 5/2001 | Dujari | 709/213 |
| 6,351,775 B1 | 2/2002 | Yu | |
| 6,438,652 B1 | 8/2002 | Jordan et al. | |
| 7,200,667 B2 * | 4/2007 | Teodosiu et al. | 709/229 |
| 2003/0233602 A1 | 12/2003 | Lindquist et al. | |
| 2004/0044718 A1 | 3/2004 | Ferstl et al. | |
| 2004/0064548 A1 | 4/2004 | Adams et al. | |
| 2004/0093381 A1 | 5/2004 | Hodges et al. | |
| 2004/0103195 A1 | 5/2004 | Chalasani et al. | |
| 2004/0103339 A1 | 5/2004 | Chalasani et al. | |
| 2004/0139144 A1 | 7/2004 | Batra et al. | |
| 2004/0167959 A1 | 8/2004 | Doyle et al. | |
| 2005/0038708 A1 * | 2/2005 | Wu | 705/26 |
| 2005/0172076 A1 * | 8/2005 | Olson et al. | 711/122 |
| 2006/0031532 A1 * | 2/2006 | Sanders | 709/227 |
| 2006/0206459 A1 * | 9/2006 | MacLaurin | 707/3 |
| 2008/0222223 A1 * | 9/2008 | Srinivasan et al. | 707/205 |

* cited by examiner

*Primary Examiner* — Djenane M Bayard
(74) *Attorney, Agent, or Firm* — William E. Schiesser; Roberts Mlotkowski Safran & Cole, P.C.

(57) ABSTRACT

A system and method of managing assets on a distributed grid enabled network. The system and method includes sending, to a content provider, a conditional request to obtain a requested asset. The system and method further includes receiving, in response to the conditional request, information to identify a most recent copy of the requested asset, and transferring the requested asset to at least one grid enabled peer for subsequent downloading to a requesting client.

30 Claims, 10 Drawing Sheets

SYSTEM AND METHOD FOR MANAGING AND DISTRIBUTING ASSETS OVER A NETWORK

FIELD OF THE INVENTION

The invention generally relates to a system and method for managing and distributing assets over a network and, more particularly, to a system and method for managing and distributing assets over a network using a grid distribution proxy solution.

BACKGROUND OF THE INVENTION

Proxy servers and grid storage solutions are used to manage and distribute assets over a network. Content proxy servers often perform three key features in a network environment such as, for example, load balancing, edging or caching and centralized traffic management. By way of example, proxy servers serve as intermediaries in a network by intercepting all requests for data (e.g., assets) and determining which asset is served locally or, alternatively, which request is forwarded to a machine containing the requested asset or assets. Thus, all network traffic flows through the proxy server rendering it a network bottleneck.

More specifically, known proxy servers store a copy of requested files (assets) to reduce the amount of load presented to other network resources upstream, such as a web server. The proxy server responds to requests by first checking that it has the latest copy and then responding with the locally stored, or cached, copy. Proxy servers also move assets closer to the edge of the network, e.g., closer to the systems requesting the assets.

In one typical implementation of a proxy server deployment topology, a client connects to the proxy server through a firewall. The proxy server issues a conditional HTTP GET against a web server that stores the requested asset. The proxy server either pulls the latest copy of the asset or serves the asset directly from the local cache. However, the primary drawback for the traditional proxy server solution is that the proxy brokers all traffic. Thus, even when the web server is providing the response, the traffic flows back through the proxy server.

Accordingly, there exists a need in the art to overcome the deficiencies and limitations described hereinabove.

SUMMARY OF THE INVENTION

In a first aspect of the invention, a method includes sending, to a content provider, a conditional request to obtain a requested asset. The method further includes receiving, in response to the conditional request, information to identify a most recent copy of the requested asset, and transferring the requested asset to at least one grid enabled peer for subsequent downloading to a requesting client.

In another aspect of the invention, the method includes receiving a request from a client to retrieve an asset residing on a remote server. The method further includes determining that the client is grid enabled and that the asset is on the remote server. The method runs rules to determine whether the requested asset should be transferred from the remote server and stored on a distributed grid system. The requested asset is transferred to at least one node on the distributed grid system and the request is responded to with an "N-sourced" message pointing to a location of the requested asset on the at least one node of the distributed grid system.

In yet another aspect of the invention, a system comprises a grid storage proxy server having logic structured and adapted to provide autonomic functionality of grid storage management. The grid storage proxy server further has logic to: receive a search request for an asset on a distributed grid network, determine if the request is provided by a client which is grid enabled, search for the requested asset on the distributed grid network and freshen the requested asset to at least one node on the distributed grid network based on at least one of attributes of the client and last update of the requested asset, and provide instructions to the client to one of retrieve the requested asset from a predetermined node or nodes on the distributed grid network and from the grid storage proxy server.

In another aspect of the invention, a computer program product comprising a computer usable medium having readable program code embodied in the medium includes at least one component to:

send, to a content provider, a conditional request to obtain a requested asset;

receive, in response to the conditional request, information to identify a most recent copy of the requested asset; and transfer the requested asset to at least one grid enabled peer for subsequent downloading to a requesting client.

In another aspect of the invention, a method for deploying an application for managing, retrieving and sending assets from a distributed network includes providing a computer infrastructure being operable to:

determine if a request for asset is provided by a client which is grid enabled, search for the requested asset on a distributed grid network and update requested asset to at least one node on the distributed grid network based on a set of defined rules; and provide instructions to the client to one of retrieve the requested asset from a predetermined node or nodes on the distributed grid network and from the grid storage proxy server when the client is not grid enabled.

DETAILED DESCRIPTION OF EMBODIMENTS OF THE INVENTION

Figure 1A:
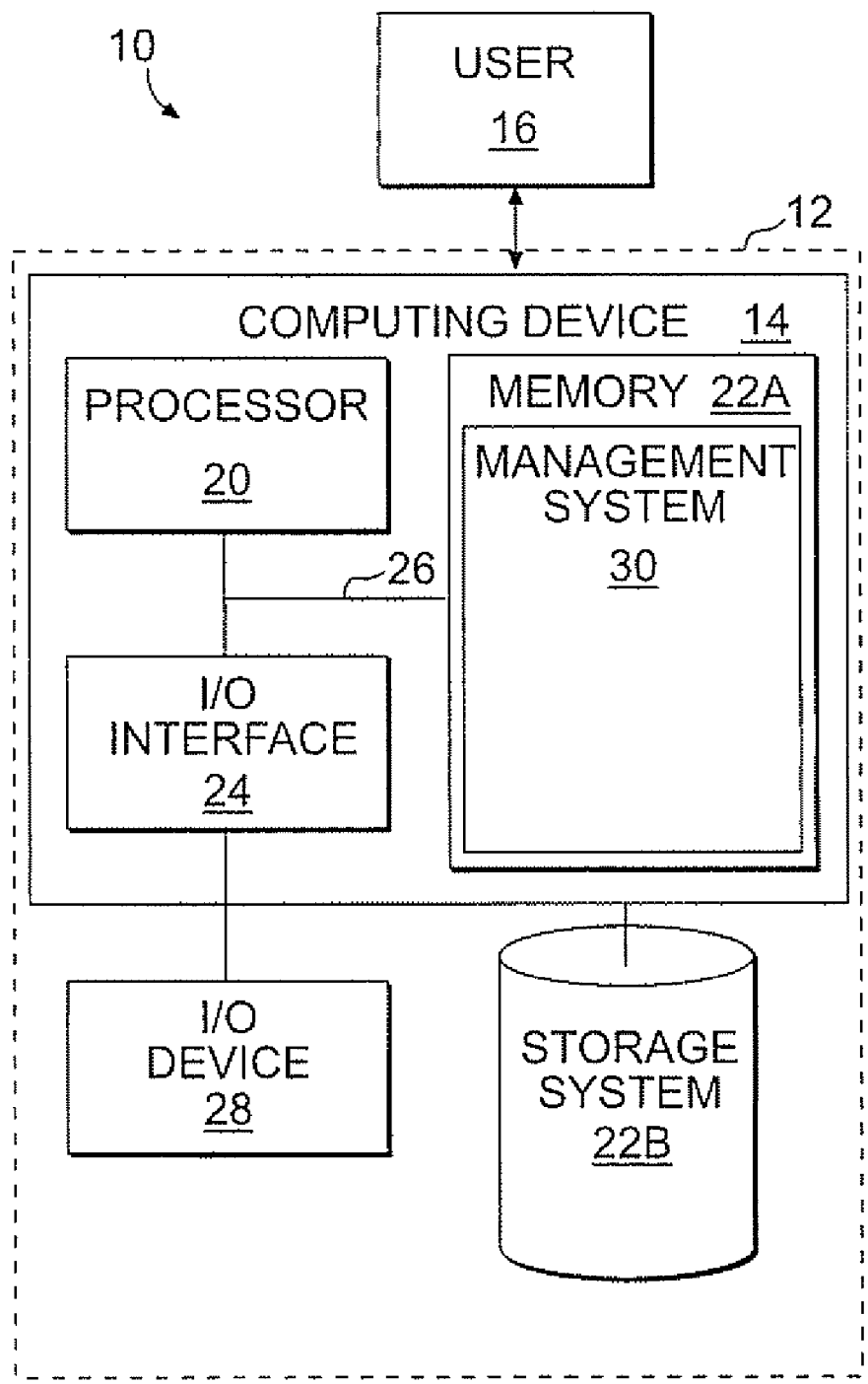
FIG. 1a is a block diagram of an environment implementing embodiments of the invention.

Grid distribution systems distribute a single asset transfer over multiple servers and multiple network connections. Grid distribution systems offer many advantages to that of traditional asset distribution systems in that they are centrally managed through a master server and virtually any computer on the network can be leveraged as part of a localized distributed file transfer. The multi-source transfer enables increase efficiencies of network bandwidth; however, management of the grid asset base requires human intervention.

To achieve the efficiencies of grid distribution systems, combinations of servers and clients respond to segmented requests allowing peer clients to pull larger fragments faster from multiple sources. This stresses each serving node for a shorter period at faster intervals and the client maximizes bandwidth throughput assuming there are no artificial limitations. Being more specific, in one implementation of a grid distribution system, an upload client pushes the asset(s) to a grid management server. (The grid management server can be thought of as a master.) The master server then manages the asset distribution to the grid enabled download peers. When a client makes a request for an asset, it connects to the master server and is provided all the grid nodes the asset resides on. In this manner, the client retrieves the asset through a multi-sourced file transfer.

With the clients often tightly coupled with storage management servers and file transfer methods, the clients make specific requests to identify the peers that have the asset. This process takes place out of band to that of normal network traffic. For example, a web page download is made up of a series of assets (html, images, audio and video). Each of these assets is requested from a web server or proxy server.

The invention is directed to a system and method for managing and distributing assets over a network and, more particularly, to a system and method for managing and distributing assets over a network implementing a grid distribution proxy solution. The invention includes a system and method for creating a grid storage proxy server which enables ad hoc grid storage management, client identification and grid identified response. By way of one implementation, the invention uses a "grid storage proxy server" which analyzes traffic to determine if it should be distributed via a grid distribution system and dynamically rerouted. In one aspect, the grid storage proxy server removes and updates identified assets (e.g., content) based on rules maintained by the grid storage proxy server. The gird storage proxy might also be controlled, not only by rules, but via an API—application programming interface (e.g., web services, REST (representational state transfer)) interface, proprietary implementation). In addition to other features, the grid storage proxy server monitors and updates asset freshness in a variety of methods eliminating the need for administrators or asset producers to engage in grid storage management issues.

In the grid distribution environment of the invention, significant network and infrastructure cost savings are realized by delivering the asset via multiple sources by, in one example, providing autonomic functionality of grid storage management. The invention thus provides the benefits of network proxy topologies and distributed asset management.

FIG. 1a shows an illustrative environment 10 for managing the processes in accordance with the invention. To this extent, the environment 10 includes a computer infrastructure 12 that can perform the processes described herein. In particular, the computer infrastructure 12 is shown including a computing device 14 that comprises a management system 30, which makes computing device 14 operable to perform the processes described herein. The computing device 14 is shown including a processor 20, a memory 22A, an input/output (I/O) interface 24, and a bus 26. Further, the computing device 14 is shown in communication with an external I/O device/resource 28 and a storage system 22B. As is known in the art, in general, the processor 20 executes computer program code, which is stored in memory 22A and/or storage system 22B. While executing computer program code, the processor 20 can read and/or write data, such as the business solution 50, to/from memory 22A, storage system 22B, and/or I/O interface 24. The bus 26 provides a communications link between each of the components in the computing device 14. The I/O device 28 can comprise any device that enables an individual to interact with the computing device 14 or any device that enables the computing device 14 to communicate with one or more other computing devices using any type of communications link.

In any event, the computing device 14 can comprise any general purpose computing article of manufacture capable of executing computer program code installed thereon (e.g., a personal computer, server, handheld device, etc.). However, it is understood that the computing device 14 is only representative of various possible equivalent computing devices that may perform the processes described herein. To this extent, in other embodiments, the functionality provided by computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computer infrastructure 12 is only illustrative of various types of computer infrastructures for implementing the invention. For example, in one embodiment, the computer infrastructure 12 comprises two or more computing devices (e.g., a server cluster) that communicate over any type of communications link, such as a network, a shared memory, or the like, to perform the process described herein. Further, while performing the process described herein, one or more computing devices in the computer infrastructure 12 can communicate with one or more other computing devices external to computer infrastructure 12 using any type of communications link. In either case, the communications link can comprise any combination of various types of wired and/or wireless links; comprise any combination of one or more types of networks (e.g., the Internet, a wide area network, a local area network, a virtual private network, etc.); and/or utilize any combination of various types of transmission techniques and protocols.

Figure 1B:
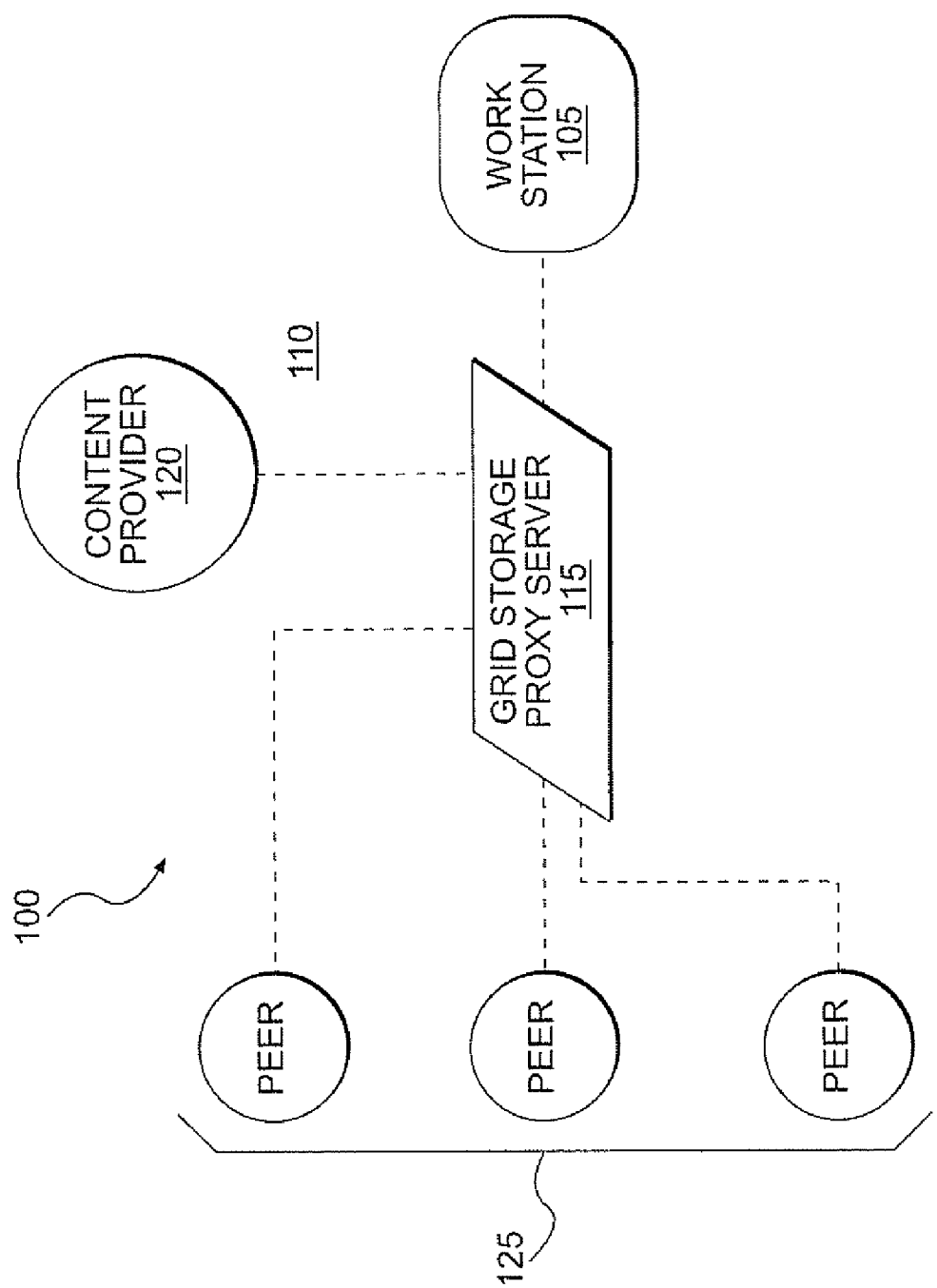
FIG. 1b is a block diagram of an embodiment of the invention.

FIG. 1b is a block diagram of an embodiment of the invention, generally denoted by reference numeral 100. Similar to FIG. 1a, the components of FIG. 1b may be used to implement the processing of the invention, as discussed more fully below. The invention includes at least one user workstation 105 (i.e., a computer for a client, a workstation, or client workstation) which typically has a memory device (for example, a hard drive, DVD drive, or the like), processor and accompanying components, all well known to those of skill in the art. The user workstation 105 may be connected via a network 110 (e.g., a local area network (LAN), a wide area network (WAN), wireless network, or the Internet) to one or more grid storage proxy servers 115.

The one or more grid storage proxy server 115 contributes, removes and updates identified assets (content) based on rules maintained by the grid storage proxy server 115. An illustrative rule may read, for example, "for every asset (content) transfer, if it is above 1 MB and requested more than 10 times in the last minute, store the asset to the grid distribution system, for evermore if the request for the asset is less than one per minute remove the asset from the grid distribution system."

Thus, the proxy might trigger based on multiple variables such as, for example, storing an asset to the grid when the number of times the file is requested per minute is over a predetermined number.

Additional and/or alternative grid storage rules are also contemplated by the invention. For example, the rule sets used for determining grid proxy promotion include but are not limited to the following metrics in any combination:

File size;
Frequency transferred over a physical segment;
Frequency transferred over time,
Predefined asset type (e.g. any MIME Type of MPEG, etc);
Aggregate number of already existing duplicate assets; and/or
Storage capacity of the grid nodes (servers and clients).

The grid storage proxy server might also be managed or controlled by an API (e.g., web services, REST interface, proprietary implementation), either by itself or in combination with rules. In implementation, the third party application may interface with the grid storage proxy server to instruct further actions, including requesting an asset to be managed, removed or updated by the grid storage proxy server. Thus, for example, instead of waiting for the system to realize the asset is outdated, the API (e.g., third party) can force the grid storage proxy server to remove the asset from the grid.

FIG. 1b further shows at least one content provider 120 provided over multiple grid enabled peers 125, connected via the network 110. In one implementation, content or assets can be retrieved from the server 120 (content provider) and managed by the grid storage proxy server 115. For example, the grid storage proxy server 115 may monitor content freshness, eliminating the need for administrators or content producers to engage in grid storage management issues. The grid storage proxy server 115 also eliminates the need for a client upload, as well as more efficiently manages the resources on the network as described more fully below.

Figure 2:
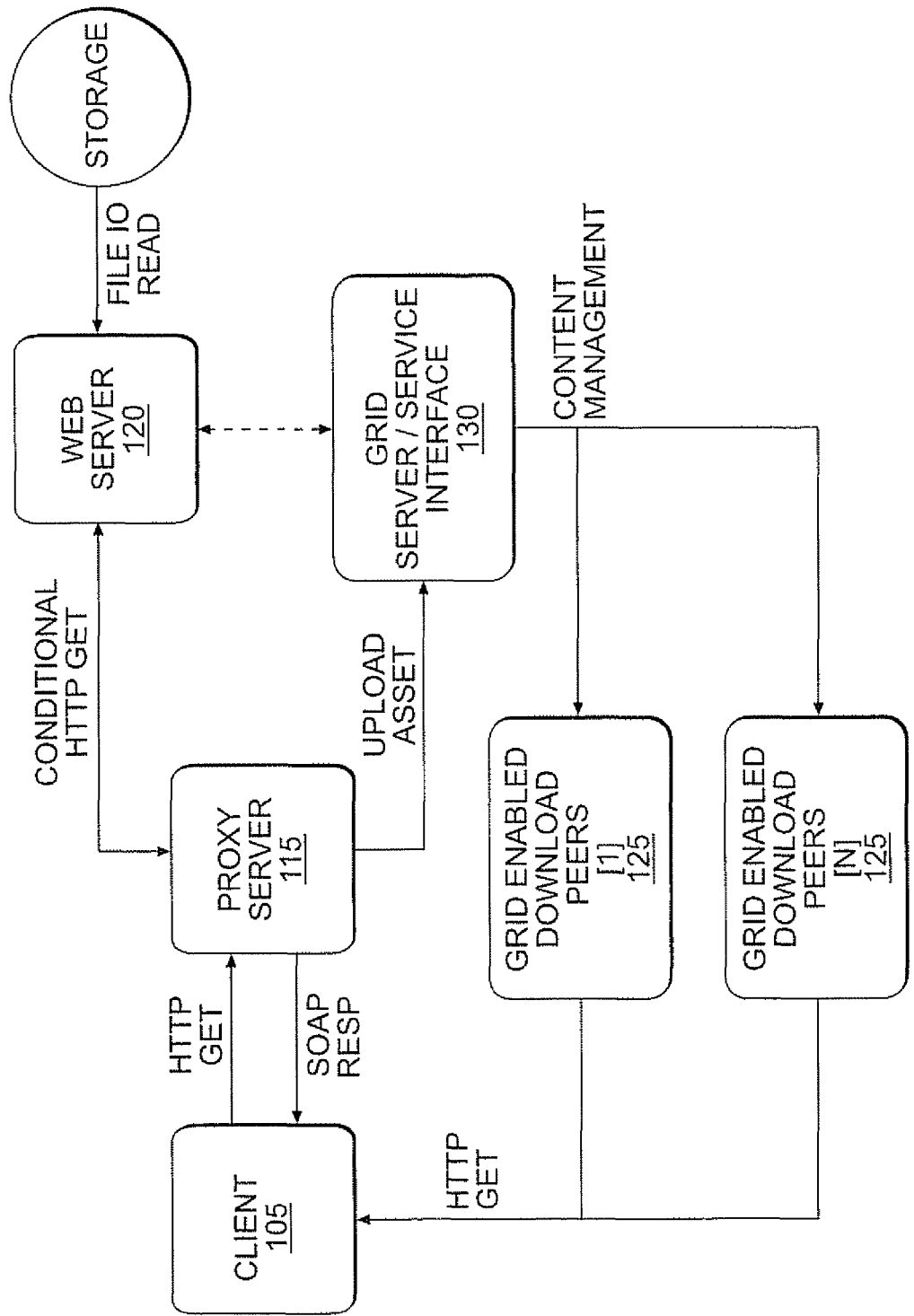
FIG. 2 shows a block diagram of one implementation of the invention.

FIG. 2 shows a block diagram of one implementation of the invention. FIG. 2 may also be representative of a flow diagram, implementing the components of the invention. In FIG. 2, a seamless network transaction is provided between the client (e.g., web browser) 105, the grid storage proxy server 115 and multiple grid enabled peers 125. The system of FIG. 2 further shows a server 120 (with storage), in addition to a grid server/service interface 130. The grid server/service interface 130 is an optional component of the invention.

In one implementation, the client 105 identifies a file (asset) it would like to download from the server 120, which is located behind the grid storage proxy server 115, and requests such asset from the grid storage proxy server 115. The grid storage proxy server 115, in turn, makes a conditional request to the server 120, using an HTTP GET command, for example. The server 120, in response, provides information about the asset, e.g., last update, to the grid storage proxy server 115.

Using the information provided by the server 120, the grid storage proxy server 115 can identify the latest copy of the asset, for example. Using this information, the grid storage proxy server 115 can determine whether it has the latest copy and, in embodiments, whether it needs to copy the asset to either the grid storage proxy server 115 or the grid server/service interface 130.

By way of one non-limiting illustration, if the grid storage proxy server 115 does not have the latest version of the asset it may request a download of the latest copy from the server 120 or, alternatively, provide a URI (Uniform Resource Identifier) to the grid server/service interface 130 for downloading of the asset, itself. If the grid storage proxy server 115 downloads the asset, it may provide such asset directly to the grid server/service interface 130. Once the asset is downloaded to the grid server/service interface 130, it may be pushed to any of the grid enabled peers 125. In embodiments, the client 105 may also become one of the grid enabled peers.

In one example, a return message may be provided to the client 105 from the grid storage proxy server 115, indicating the location of the asset on the grid. This will allow the client 105 to establish a multi-sourced file transfer automatically. In other words, the client 105 is able to retrieve the asset from one or more of the grid enabled peers 125.

In one non-limiting illustration, the message may be, for example, in the form of a SOAP (simple object asset protocol) response where an XML fragment describes the data required to process the grid transfer. Alternatively the response might come in the form of a redirect URL (Uniform Resource Locator) which either contains a special path as part of the URL or simply points to a host name governed by round robin DNS. (Round robin DNS is a hostname (www.example-server-hostname.com) that resolves differently each time a request is made to retrieve its IP address. This forces load distribution at the DNS level.) In another example, the URL might simply be that of the traditional Grid Management Server.

In one implementation, as part of the HTTP request header, a user-agent may be sent to identify the type of client requesting the content. (Servers use user-agents to identify other capabilities that might not be supported by all servers but needs to be identified.) In the case the grid storage proxy server 115 identifies that the client 105 is grid enabled, instructions can be provided to the client 105 so that it can retrieve the content from the grid, as describe above. However, if the client 105 is not grid enabled the response would have been served from the HTTP server, but ultimately it would have transferred from the grid storage proxy server 115.

In a more specific illustration of FIG. 2, the client 105 requests an asset from the grid storage proxy server 115. The grid storage proxy server 115, depending on a set of predefined rules (as exemplified above), will query the server 120 for the asset. The grid storage proxy server 115 may acquire the asset from the server 120 or, in embodiments, determine that it already has a most recent version of the asset. The asset can be loaded to the grid server/service interface 130 which, in turn, provides content management to the grid enabled peers 125, e.g., propagate the content to the peer. In implementations, the grid storage proxy server 115 may provide a URI to the grid server/service interface 130, which can use the URI to obtain the asset directly from the web server 120. This same process may be used to pull the asset from the grid server/service interface 130.

During this exchange the grid storage proxy server 115 may determine whether the client 105 is grid enabled. If the client is grid enabled, the grid storage proxy server 115 may transmit a SOAP, which lists the peers having the assets. The client, using these instructions, may then access and downloads the asset on the grid distribution system 125. Variations can be created between the method of communicating between the client and the grid storage proxy server 115 once the client has been identified as being grid capable. This alternative communication may be a protocol identifier (e.g. gridftp://host?uid=asset).

The grid storage proxy server 115 may elect to remove the file (asset) from the grid distribution system after it is used by the client. The rule for this example might read, "if the request for the asset is less than one per minute remove the asset from the grid distribution system."

This will ensure that storage is utilized in a cost efficient manner.

Figure 3:
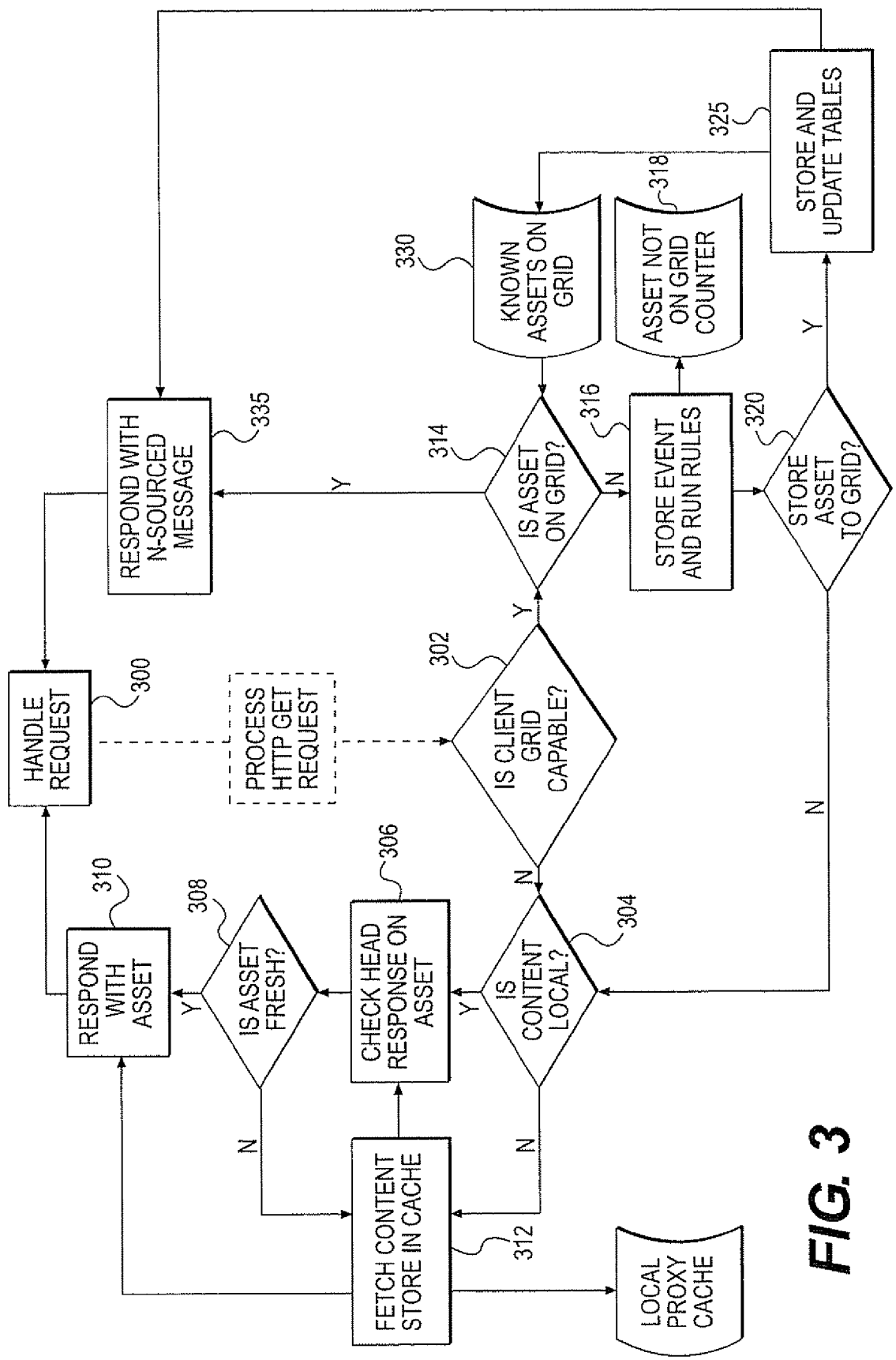
FIG. 3 is a flow diagram implementing steps of an embodiment of the invention.

FIG. 3 shows a flow diagram of steps implementing an embodiment of the invention. In particular, the processes of FIG. 3 are representative of an example, grid storage proxy logic. FIG. 3 and any additional flow diagrams may also be representative of a high-level block diagram, implementing the steps of the invention. The steps of FIG. 3 (and any additional flow diagrams) may be implemented on computer program code in combination with the appropriate hardware. This computer program code may be stored on storage media such as a diskette, hard disk, CD-ROM, DVD-ROM or tape, as well as a memory storage device or collection of memory storage devices such as read-only memory (ROM) or random access memory (RAM).

At step 300 the grid storage proxy server will handle a request from a client by processing the HTTP GET request, as discussed above. At step 302, a determination is made as to whether the client is grid enabled. If the client is not grid enabled, at step 304, a determination is made as to whether the asset is local on the grid storage proxy server. If the asset is local, a header is checked on the asset to determine if the asset is fresh at steps 306 and 308. If the asset is fresh, the grid storage proxy server will respond with the asset, at step 310. If the content is not local, at step 312, the grid storage proxy server will fetch the asset and store the asset. Again, at step 310, the grid storage proxy server will respond with the asset.

If, at step 302, it is determined that the client is grid enabled, the flow will continue to step 314. At step 314, a determination is made as to whether the asset is on the grid. If the asset is not on the grid, the grid storage proxy server will store the event and run rules to determine whether the grid storage proxy server should obtain the asset from a server, at step 316. At step 318, a counter may be used to determine how many times the asset was requested by clients. This may be useful when implementing certain rules such as, for example, storing the asset on the grid if it was requested more than 10 times in the last minute.

At step 320, a determination is made as to whether the asset should be stored on the distributed grid system. If not, the logic proceeds to step 304. If the asset is to be stored on the grid, at step 325, the content is stored and tables are updated showing the placement of such asset(s) on the grid. The flow then proceeds to either step 330 or 335. At step 330, the content is updated and the logic returns to step 314. At step 335, on the other hand, the grid storage proxy server will respond to the client with an "N-sourced" message. This message may include, for example, the location of the asset on one or more of the grid enabled peers.

Figure 4:
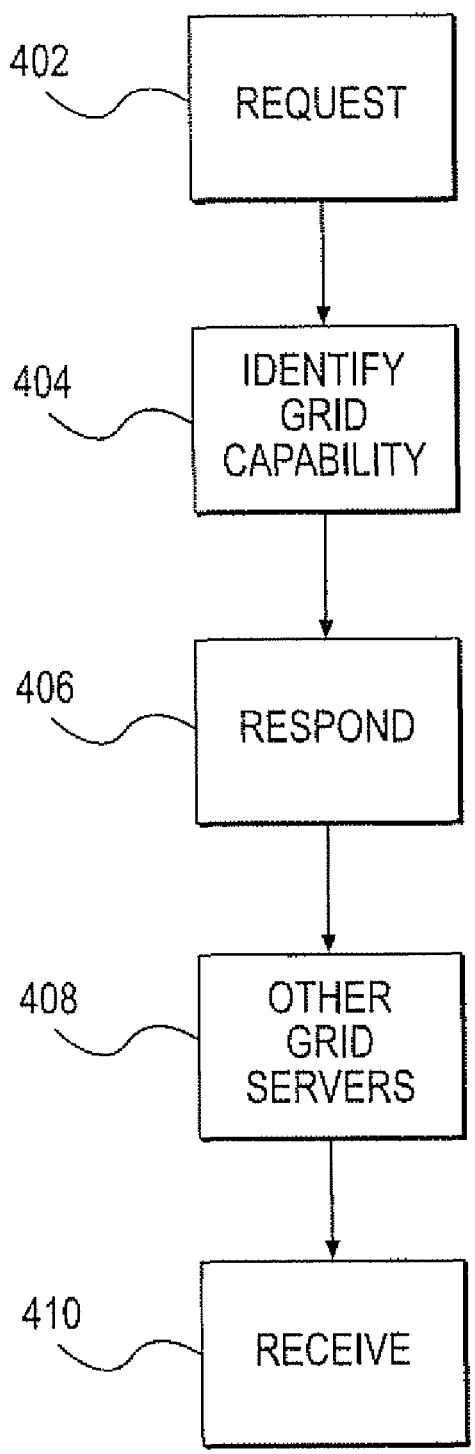
FIG. 4 is a flow diagram implementing steps of an embodiment of the invention.

FIG. 4 is a flow diagram implementing steps of an embodiment of the invention. At step 402, a first system requests an asset from a second system. The second system may be the grid storage proxy server. At step 404, the second system identifies the first system's grid capability which may include, for example, any one of a protocol header, handshake or known URI fragment.

At step 406, the second system responds with the asset or pointers to other grid enabled peers. The pointers to other grid enabled peers may further be determined based on attributes describing the client (or requester) in relation to other grid nodes such as, for example, geographic location, organizational rank, affiliations in a group, subnet, to a host of other attributes. The pointers might include a structured markup list. At step 408, other grid enabled peers are determined by a third system such as the grid storage management system (grid server/service interface 130) described above. At step 410, the first system receives the information which is the asset or the pointers to other grid enabled peers. The first system is then capable of contacting each peer to proceed with the data transfer.

Figure 5:
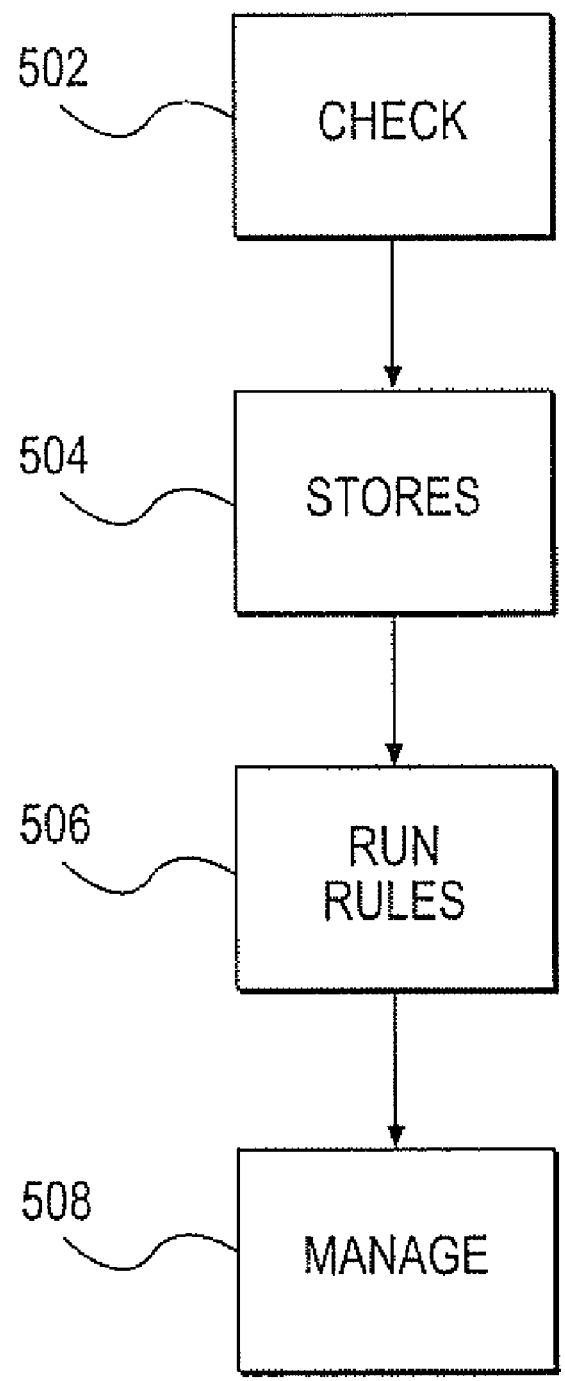
FIG. 5 is a flow diagram implementing steps for asset awareness on the grid, in accordance with the invention.

FIG. 5 is a flow diagram implementing process steps for asset awareness on the grid, in accordance with the invention. At step 502, the second system (e.g., grid storage proxy server) checks if the asset is on the distributed grid system. This check may include, for example, a distributed search, a local index or publish/subscribe mechanism. At step 504, the second system stores the asset request as an event. The storage of the event may be in memory, file, local disk, web services storage SAN (storage area network), NFS (Network File System) or to a database accessible to the second system. At step 506, the second system runs rules to determine if the asset should be stored on the distributed grid system. The rules and its determination are concluded based on an evaluation of a running history of previous events involving similar assets, for example.

At step 508, the second system manages the file distribution from source to grid, which may be a push or pull process. In implementations, the grid nodes are sent URIs of assets to (i) refresh the assets, (ii) push assets from the proxy or (iii) send messages facilitating grid distribution. The steps 504 to 508 may be implemented by a third system such as an additional server. The steps 502 to 508 may run asynchronous to any transaction.

Figure 6:
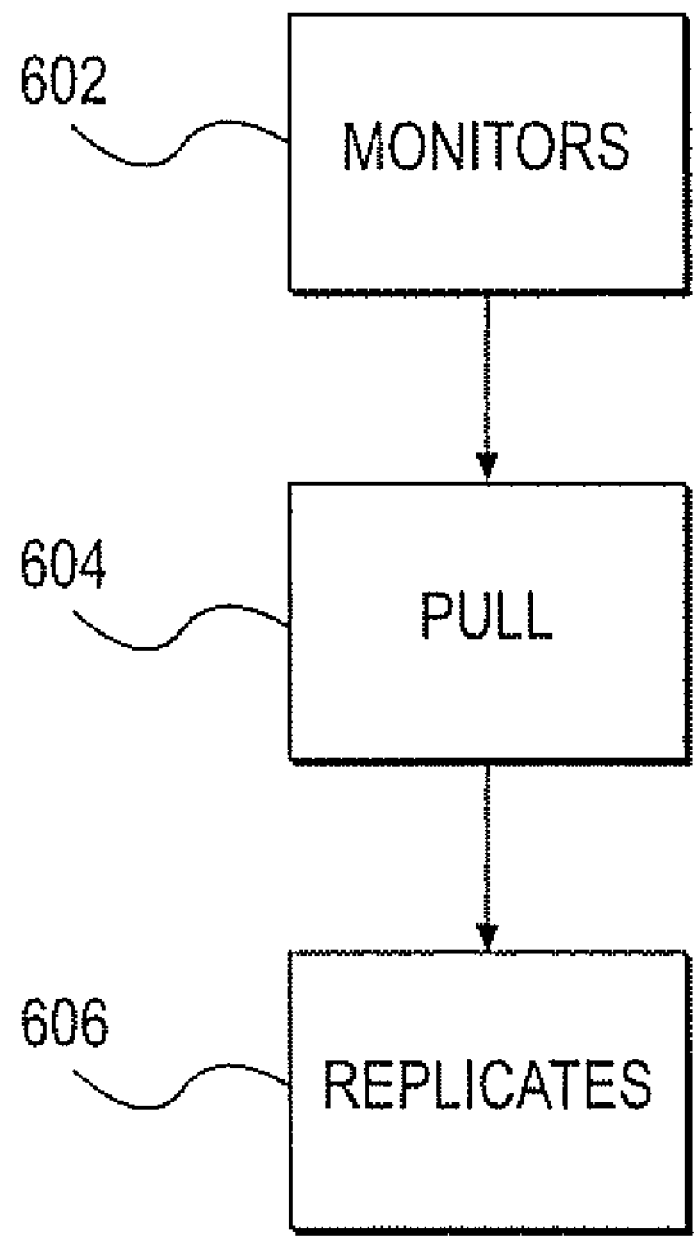
FIG. 6 is a flow diagram implementing steps for checking asset freshness, in accordance with the invention.

FIG. 6 is a flow diagram implementing steps checking asset freshness, in accordance with the invention. At step 602, the second machine asynchronously monitors known grid assets and checks the freshness of the asset. The second machine may be the grid storage proxy server or a third server. The known grid assets may be stored in any one of memory, file, disk cache or a database and the checking for freshness of the asset might take into consideration, for example, the timestamp and/or byte size of the asset. At step 604, if the second machine determines an asset is not fresh, it pulls the asset from the source and places it into storage. The storage may include, for example, memory, local disk, database, SAN (storage area network), NFS (Network File System) or the distributed grid system, itself. At step 606, the second machine replicates the asset to the grid, which may be a push or pull process. For example, in one process, the grid nodes (peers) are sent URIs of the asset to freshen. The asset may also be pushed from the grid storage proxy server, etc. The message can be sent over a publish/subscribe infrastructure or message queue.

Figure 7:
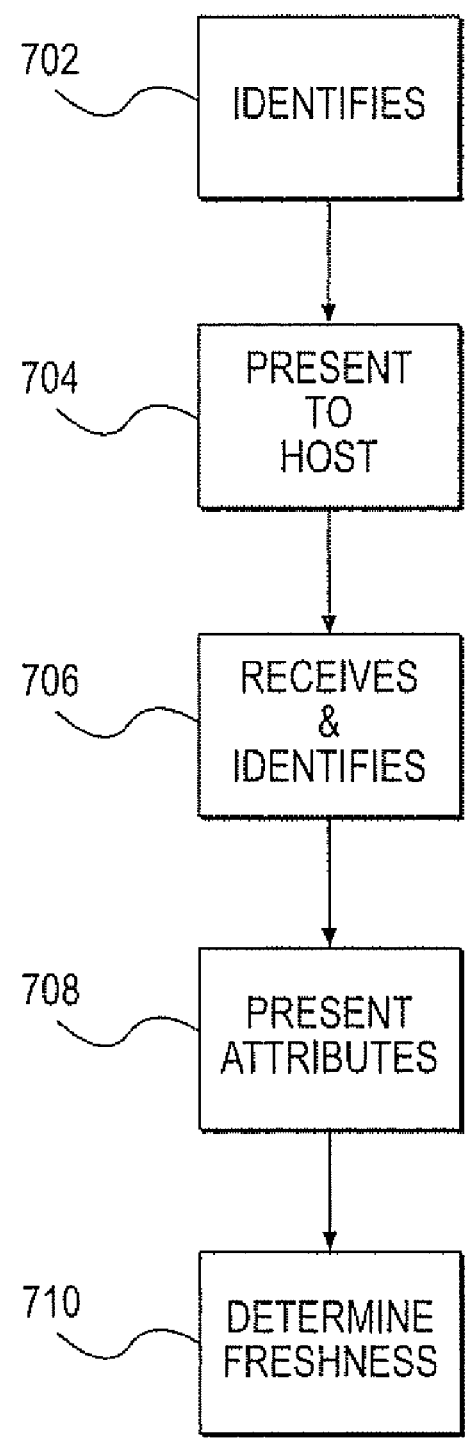
FIG. 7 is a flow diagram implementing steps for determining asset freshness, in accordance with the invention.

FIG. 7 is a flow diagram implementing steps for determining asset freshness, in accordance with the invention. At step 702, a first machine (e.g., grid storage proxy server or a third system) identifies the asset identifier, data size and the host URI. At step 704, the asset identifier is presented to the host URI, which may take the form of a HTTP HEAD request. At step 706, the second machine receives the presentation from the first machine and identifies the asset corresponding to the presented identifier and distinguishes attributes of the asset. The attributes illustratively include the data size or last modified field. At step 708, the second machine presents the first machine with the attributes corresponding to the asset identifier. At step 710, the first machine determines freshness, which might include comparing the known attributes to the attributes presented by a second system.

Figure 8:
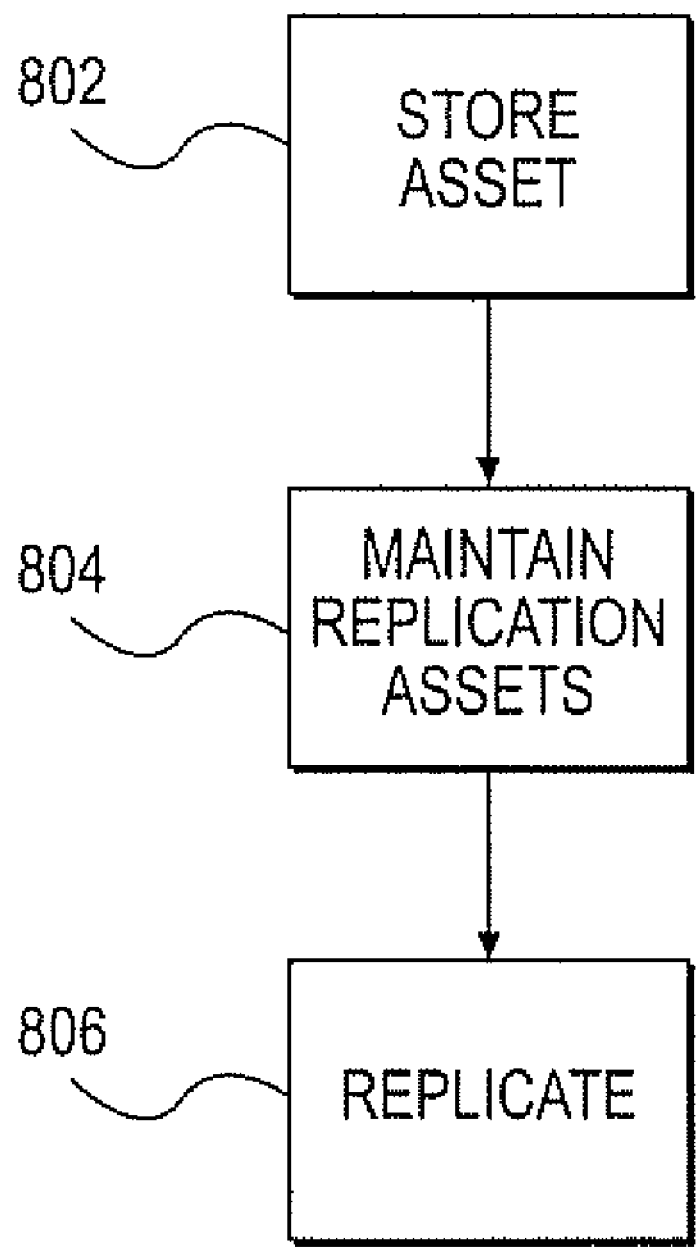
FIG. 8 is a flow diagram implementing steps for centrally managing assets on the grid, in accordance with the invention.

FIG. 8 is a flow diagram implementing steps for centrally managing assets on the grid, in accordance with the invention. At step 802, the first system stores assets, for example, in memory, local disk, database, SAN, NFS or the grid system, itself. At step 804, the first system maintains replication of assets. The process is optionally an asynchronous process executing replication by which the original asset is represented in the grid storage proxy server. At step 806, the first system replicates its storage to other grid nodes, which may be a push or pull process.

At least two approaches are contemplated to propagate assets from the grid storage proxy server or web server to a content management peer or other distribution servers (peers). First, the distribution servers (peers) can connect to the grid storage proxy server or web server to transfer a copy of the original file. Second, as the file is propagated through the network, distribution servers can connect to a content management peer to identify which peers of the network are capable of serving all or part of the asset in question. In this way, as the file is replicated to the distribution servers there are more points on the network to transfer from thus increasing overall speed in replicating the asset on the network.

Figure 9:
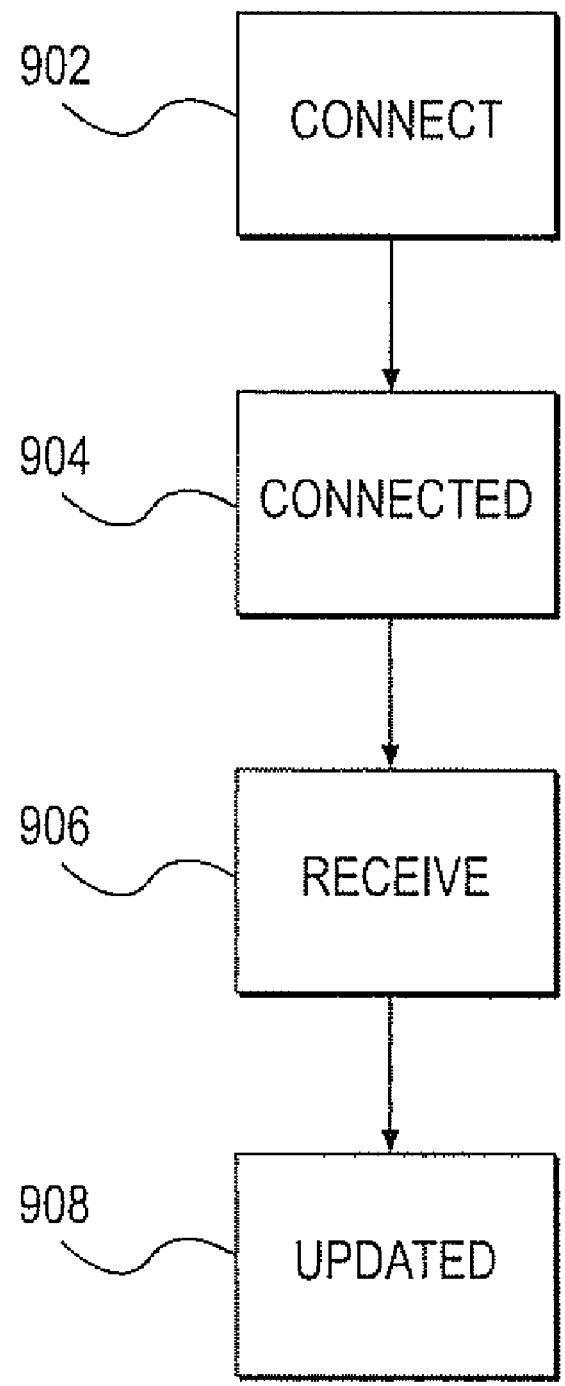
FIG. 9 is a flow diagram implementing steps showing distribution servers connecting to a content management peer, in accordance with the invention.

More specifically, referring to FIG. 9, at step 902, distribution servers can connect to a content management peer to identify which peers of the network are capable of serving all or part of the asset in question. At step 904, the content management peer (grid) is connected to and a request is provided to the peers, which have the asset. At step 906, the list of distribution servers is received by the client and the client will begin the multithreaded, multi-point transfer from all the distribution servers. At step 908, the content management peer is updated as a new distribution server with the asset.

In embodiments, the examples provided herein may be implemented and executed from either a server, in a client server relationship, or they may run on a user workstation with operative information conveyed to the user workstation to create the navigation outlined above. Additionally, the invention can take the form of an entirely hardware embodiment, an entirely software embodiment or an embodiment containing both hardware and software elements.

In an embodiment, the invention is implemented in software, which includes but is not limited to firmware, resident software, microcode, etc. Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-RAN) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

In another embodiment, the invention provides a business method that performs the process steps of the invention on a subscription, advertising, and/or fee basis. That is, a service provider, such as a Solution Integrator, could offer to manage and distribute content over a network. In this case, the service provider can create, maintain, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

While the invention has been described in terms of embodiments, those skilled in the art will recognize that the invention can be practiced with modifications and in the spirit and scope of the appended claims.

What is claimed is:

1. A method, comprising:
determining whether a client requesting an asset is grid enabled;
sending from a grid storage proxy server a conditional request to a content provider to obtain information about the requested asset in order to make a determination that the grid storage proxy server either has a most recent copy of the requested asset or needs to copy the requested asset to itself or a management interface, wherein the grid storage proxy server queries the content provider based on a set of rules which are used to instruct the grid storage proxy server to contribute, remove and update identified assets and the grid proxy server manages the requested asset by contributing, removing and updating the requested asset to and from a distributed grid network based on the set of rules, which are maintained by the grid storage proxy server;
receiving, in response to the conditional request, the information to identify the most recent copy of the requested asset; and
transferring the requested asset to at least one grid enabled peer for subsequent downloading to the requesting client.

2. The method of claim 1, wherein the transferring includes providing a URI directed to the at least one of the grid enabled peer having the requested asset.

3. The method of claim 1, wherein the transferring includes providing the requested asset to the management interface, which provides the requested asset to the at least one grid enabled peer, via a push or pull operation.

4. The method of claim 1, further comprising:
providing a return message to the requesting client indicating a location of the requested asset on any of the at least one grid enabled peer; and
permitting establishment of a multi-sourced file transfer automatically based on the return message,
wherein the return message is one of a (i) SOAP (simple object asset protocol) response where an XML fragment describes data required to process grid transfer of the requested asset and (ii) a redirect URL (Uniform Resource Locator) which contains a special path or points to a host name.

5. The method of claim 1, wherein if the client requesting the asset is grid enabled, then providing instructions to the client so that the client can retrieve the requested asset from the at least one grid enabled peer.

6. The method of claim 1, wherein if the client requesting the asset is not grid enabled, then providing the requested asset through the grid storage proxy server.

7. The method of claim 1, further comprising running through the set of rules to determine at least whether the requested asset is cached or fresh.

8. The method of claim 1, further comprising removing the requested asset from the at least one grid enabled peer after a predetermined amount of time.

9. The method of claim 1, further comprising managing identified assets based on the set of rules and a third party interface, wherein the set of rules include at least one of file size, frequency of transfer, predefined asset type, aggregate number of already existing duplicate assets; and storage capacity of grid enabled peers.

10. The method of claim 1, wherein an establishment of the at least one grid enabled peer is determined based on attributes describing the requesting client in relation to the at least one grid enabled peer.

11. The method of claim 1, wherein the at least one grid enabled peer is sent URI of the requested asset to (i) refresh the requested asset, (ii) push the requested asset or (iii) send messages facilitating grid distribution of the requested asset.

12. The method of claim 1, further comprising asynchronously monitoring assets and checking freshness of the assets on the at least one grid enabled peer.

13. The method of claim 1, further comprising propagating the requested asset through a network comprising the at least one grid enabled peer and identifying which peers of the network are capable of serving all or part of the requested asset.

14. The method of claim 1, wherein the steps take the form of an entirely hardware component, software component or containing both hardware and software components.

15. The method of claim 1, wherein the user agent is part of an HTTP request header to the client to identify a client type.

16. The method of claim 1, wherein the rules include at least one of: file size, frequency transferred over a physical segment, frequency transferred over time, predefined assets including MIME type and MPEG; aggregate number of already existing duplicate assets and storage capacity.

17. The method of claim 16, wherein the grid storage proxy server is also managed or controlled by an API.

18. The method of claim 16, wherein the grid storage proxy server monitors content freshness thereby eliminating administrators or content producers to engage in grid storage management issues.

19. The method of claim 18, wherein the grid storage proxy server, when it determines it does not have the latest version of the requested asset, downloads the latest copy of the requested asset from the content provider or provides a URI to the management interface for downloading of the latest copy.

20. The method of claim 19, wherein the management interface is a different entity from the client requesting the asset.

21. The method of claim 1, wherein determining asset freshness includes:
the grid storage proxy server identifies an asset identifier, data size and host URI;
the asset identifier is presented to the host URI;
a second machine receives a presentation from the grid storage proxy server and identifies the asset corresponding to the identifier and distinguishes attributes of the asset;
the second machine presents the grid storage proxy server with the attributes corresponding to the asset identifier; and
the grid storage proxy server determines freshness, which includes comparing known attributes to the attributes presented by the second machine.

22. The method of claim 1, wherein management of the requested asset by the grid proxy server comprises:
storing the requested asset in memory, local disk or to the distributed grid network;
maintaining replication of the requested asset; and
replicating storage of the requested asset to other grid nodes on the distributed grid network using a push or pull process.

23. The method of claim 22, wherein the set of rules allow for the grid proxy server to automatically manage the indentified asset on the distributed grid network without manual intervention.

24. The method claim 23, wherein the determining whether the client requesting the asset is grid enabled is determined by using an agent as part of header information.

25. A method, comprising:
receiving a request from a client to retrieve an asset residing on a remote server;
determining that the client is grid enabled using an agent as part of a header information and that the asset is on the remote server;
running rules on a grid storage proxy server to determine whether the requested asset should be transferred from the remote server and stored on a distributed grid system wherein the grid proxy server manages the requested asset by contributing, removing and updating the requested asset to and from the distributed grid system based on the rules, which are maintained by the grid storage proxy server;
transferring the requested asset to at least one node on the distributed grid system; and
responding to the received request with a multiple source message pointing to a location of the requested asset on the at least one node of the distributed grid system.

26. The method of claim 25, further comprising determining that the client is not grid enabled and that the requested asset is stored on a machine receiving the request, and sending a local copy of the requested asset to the client;
checking a freshness of the requested asset and updating the requested asset based on a predetermined rule or an API (application program interface) call; and
fetching the requested asset from the remote server when the requested asset is not local, and downloading a pointer or the asset to the client for retrieval.

27. The method of claim 25, further comprising checking if the requested asset is on the distributed grid system, wherein the checking includes at least one of a distributed search, a local index and publish/subscribe mechanism.

28. The method of claim 25, further comprising identifying an asset identifier; receiving presentation of the asset identifier; identifying an asset corresponding to the asset identifier and distinguishing attributes therefrom; and presenting the attributes corresponding to the asset identifier to determine freshness of the asset by comparing known attributes to the presented attributes.

29. The method of claim 25, further comprising centrally managing assets on the distributed grid system by asynchronously process executing replication by which an original asset is represented in a grid storage proxy server.

30. A method for deploying an application for managing, retrieving and sending assets from a distributed network, comprising: providing a computer infrastructure being operable to: determine if a request for asset is provided by a client which is grid enabled by using an agent as part of a header information; search for the requested asset on a distributed grid network and update requested asset to at least one node on the distributed grid network by making a transfer of the asset based on a set of defined rules: wherein a grid proxy server manages the requested asset by contributing, removing and updating the requested asset to and from the distributed grid network based on the defined set of rules, which are maintained by the grid storage sever; and provide instructions to the client to one of retrieve the requested asset from a predetermined node or nodes on the distributed grid network and from the grid storage proxy server when the client is not grid enabled.

* * * * *